United States Patent [19]

Cox

[11] 4,401,947

[45] Aug. 30, 1983

[54] SMALL HOLE WELL LOGGING SONDE AND SYSTEM WITH TRANSMITTER AND RECEIVER ASSEMBLIES

[75] Inventor: Percy T. Cox, Houston, Tex.

[73] Assignee: Texaco Inc., White Plains, N.Y.

[21] Appl. No.: 191,095

[22] Filed: Sep. 26, 1980

[51] Int. Cl.³ ............................................. G01V 3/28
[52] U.S. Cl. ................................... 324/338; 324/339
[58] Field of Search .............................. 324/338–343, 324/346

[56] References Cited

U.S. PATENT DOCUMENTS

| 3,214,686 | 10/1965 | Elliot et al. | 324/339 |
| 3,582,766 | 6/1971 | Iizuka | 324/338 |
| 3,993,944 | 11/1976 | Meador et al. | 324/339 X |
| 4,319,191 | 3/1982 | Meador et al. | 324/338 X |
| 4,323,848 | 4/1982 | Kuckes | 324/338 |

Primary Examiner—Gerard R. Strecker
Attorney, Agent, or Firm—Carl G. Ries; Robert A. Kulason; Ronald G. Gillespie

[57]  ABSTRACT

A well logging sonde has an outer diameter of 1-11/16 inches or less and includes a transmitter coil and at least two receiver coils. The coils are contained in a coil housing. A transmitter circuit provides a signal for energizing the transmitter coil to develop an electromagnetic field in an earth formation. A transmitter case contains the transmitter circuit and is mechanically connected to the coil housing so that the transmitter provides the signal to the transmitter coil which develops the corresponding electromagnetic field in the earth formation. A receiver circuit receives signals from the receiver coils resulting from the reception of electromagnetic energy from the electromagnetic field after passage through the earth formation. The receiver circuit provides a signal representative of at least one characteristic of the earth formation in accordance with the signals from the receiver coils. The receiver circuit is housed in a receiver case which is mechanically connected to the coil housing in a manner so that the receiver coils provide their signals to the receiver means. A cable connector is mechanically connected to a well logging cable so as to electrically connect the receiver circuit to at least one conductor in the well logging cable.

22 Claims, 13 Drawing Figures

FIG. 5
FIG. 6
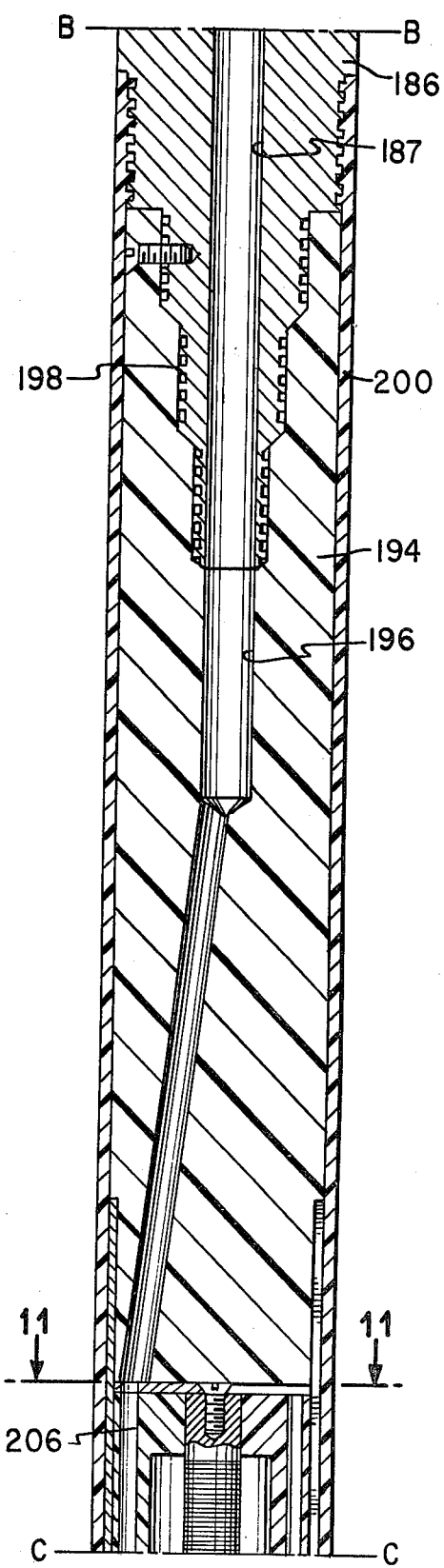
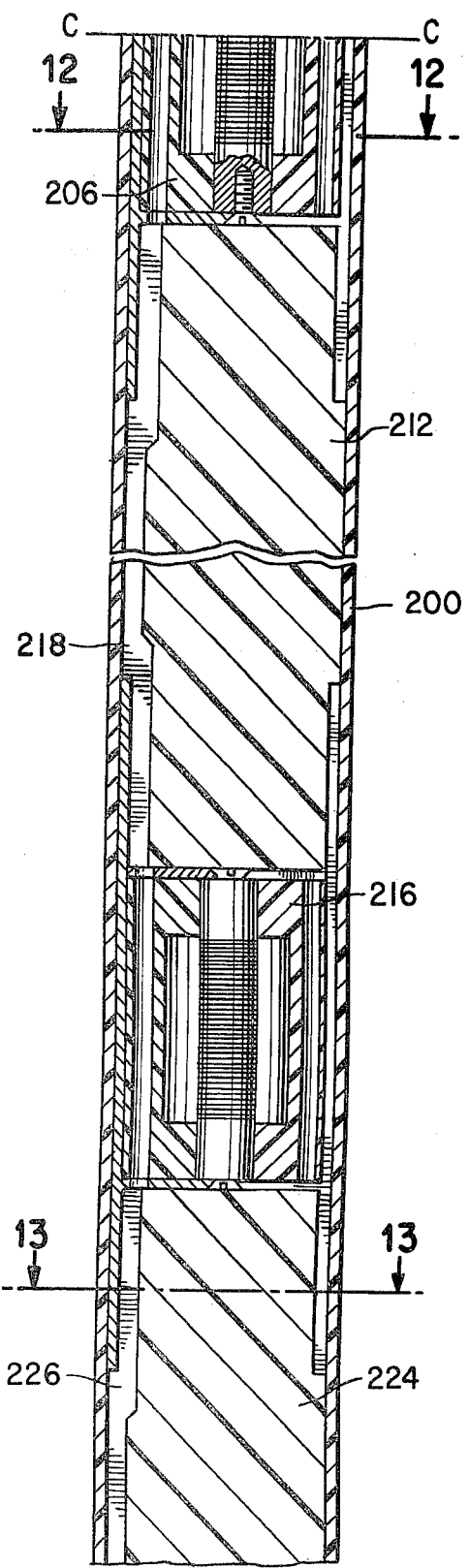

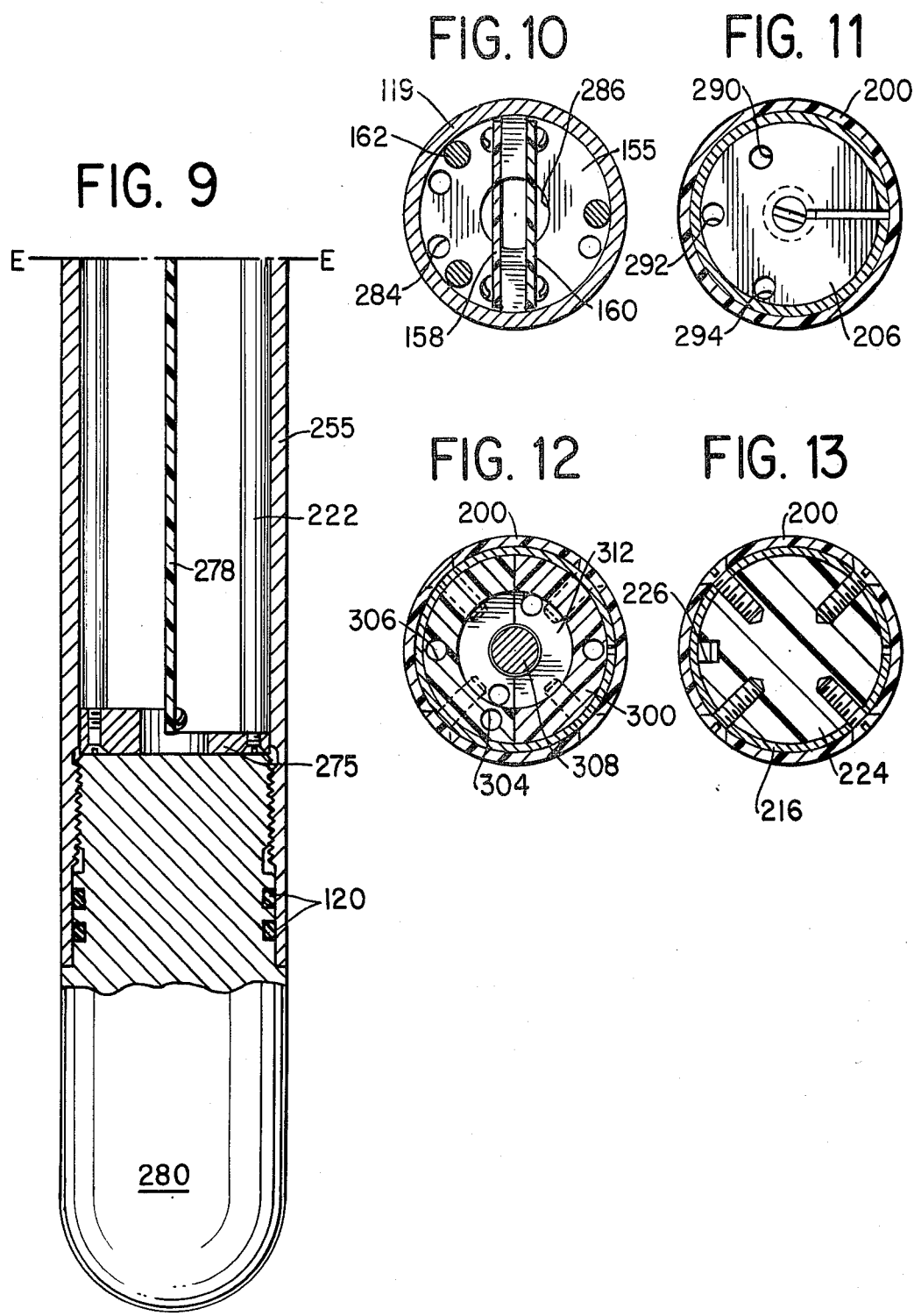

SMALL HOLE WELL LOGGING SONDE AND SYSTEM WITH TRANSMITTER AND RECEIVER ASSEMBLIES

BACKGROUND OF THE INVENTION

1. Field of the Invention

The present invention relates to monitoring instruments in general and, more particularly, to a well logging sonde and system.

2. Summary of the Invention

A well logging sonde having an outer diameter of 1-11/16 inches or less includes a passive element housing adapted to be physically and electrically connected to other members of the sonde, a transmitter case, a receiver case, and a cable connector. The passive element houses a transmitter coil and two receiver coils in a predetermined spatial relationship to each other. The transmitter case contains a transmitter circuit which provides a signal to energize the transmitter coil so as to develop an electromagnetic field in an earth formation. The receiver case contains a receiver circuit which receives signals from the receiver coils resulting from the reception of electromagnetic energy from the electromagnetic field after passage through the earth formation and provides a signal representative of at least one characteristic of the earth formation in accordance with the signals from the receiver coils. The cable connector includes an output connector adapted to be physically and electrically connected to a well logging cable so that a signal appearing at the output connector is provided to the cable. The cable connector is also adapted to be and is physically connected to the receiver case in a manner so as to provide the signal from the receiver circuit to the output connector.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIGS. 3 through 9 are detailed mechanical drawings of the well logging instrument shown in FIG. 1.

FIGS. 10 through 13 are cross-sectional views at different locations of the well logging instrument shown in FIGS. 3 through 9.

DESCRIPTION OF THE INVENTION

Some of the world's largest oil fields have many open hole producing wells which contain a small diameter production or "kill string" tubing through which logging tools must pass before reaching the open hole interval. The present invention is a slim hole resistivity well logging tool which is capable of logging wells containing tubing as small as two inches in internal diameter. Logging these wells with standard 3⅜" resistivity sondes requires the tubing to be pulled, at great expense.

Figure 1:
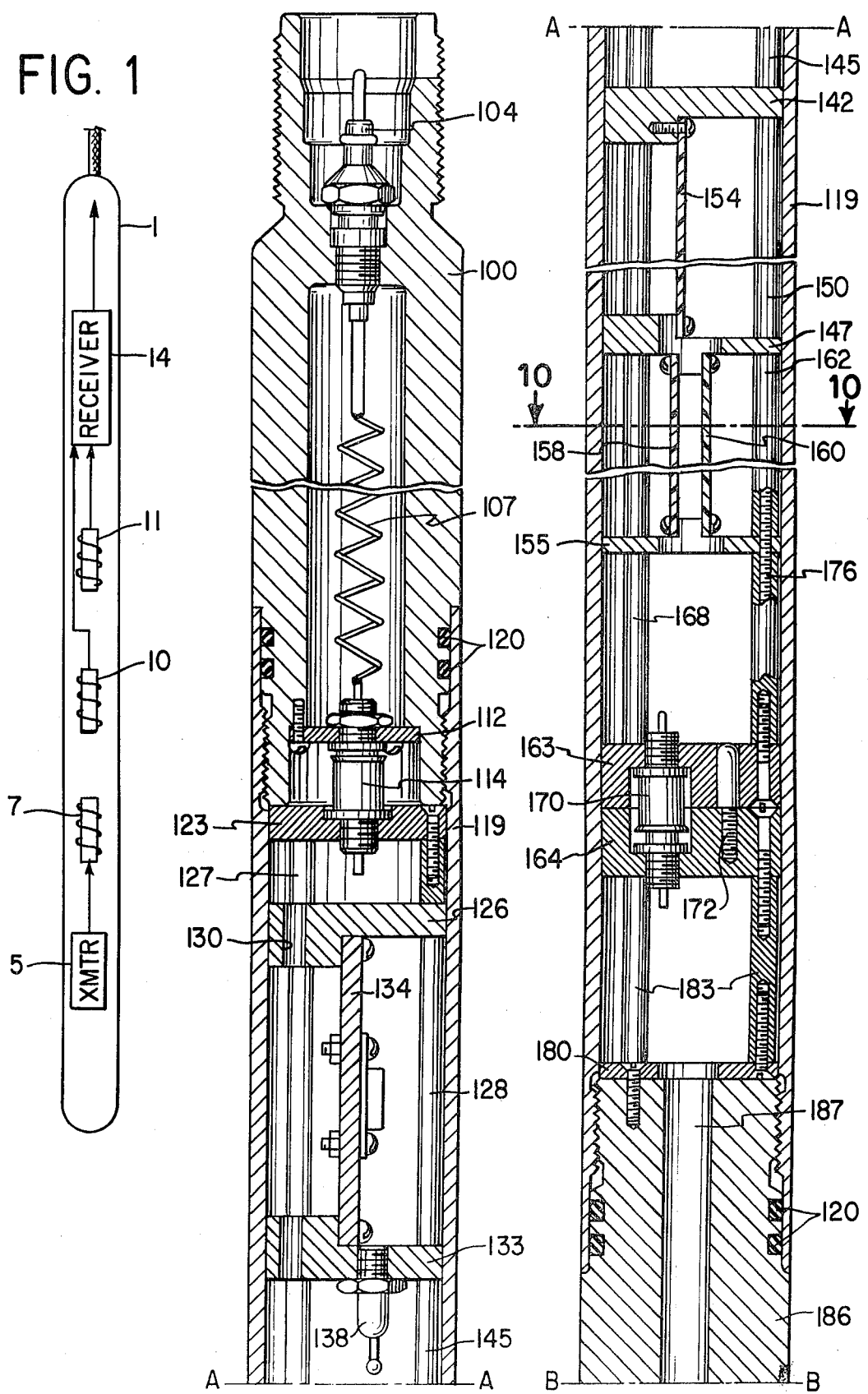
FIG. 1 is a simplified diagram of a well logging instrument constructed in accordance with the present invention.

Referring to FIG. 1, a logging sonde 1 is 1-11/16" in diameter. A transmitter 5 provides an alternating current signal at a predetermined frequency preferably that of 2 megahertz to a transmitter coil 7. Transmitter coil 7 transmits electrical energy into the earth formation. Receiver coils 10 and 11 are spaced 25 and 37 inches, respectively, from transmitter coil 7. Receiver coils 10 and 11 receive electrical energy that has passed through the earth's formation and provides corresponding alternating current signals to a receiver 14.

Figure 2:
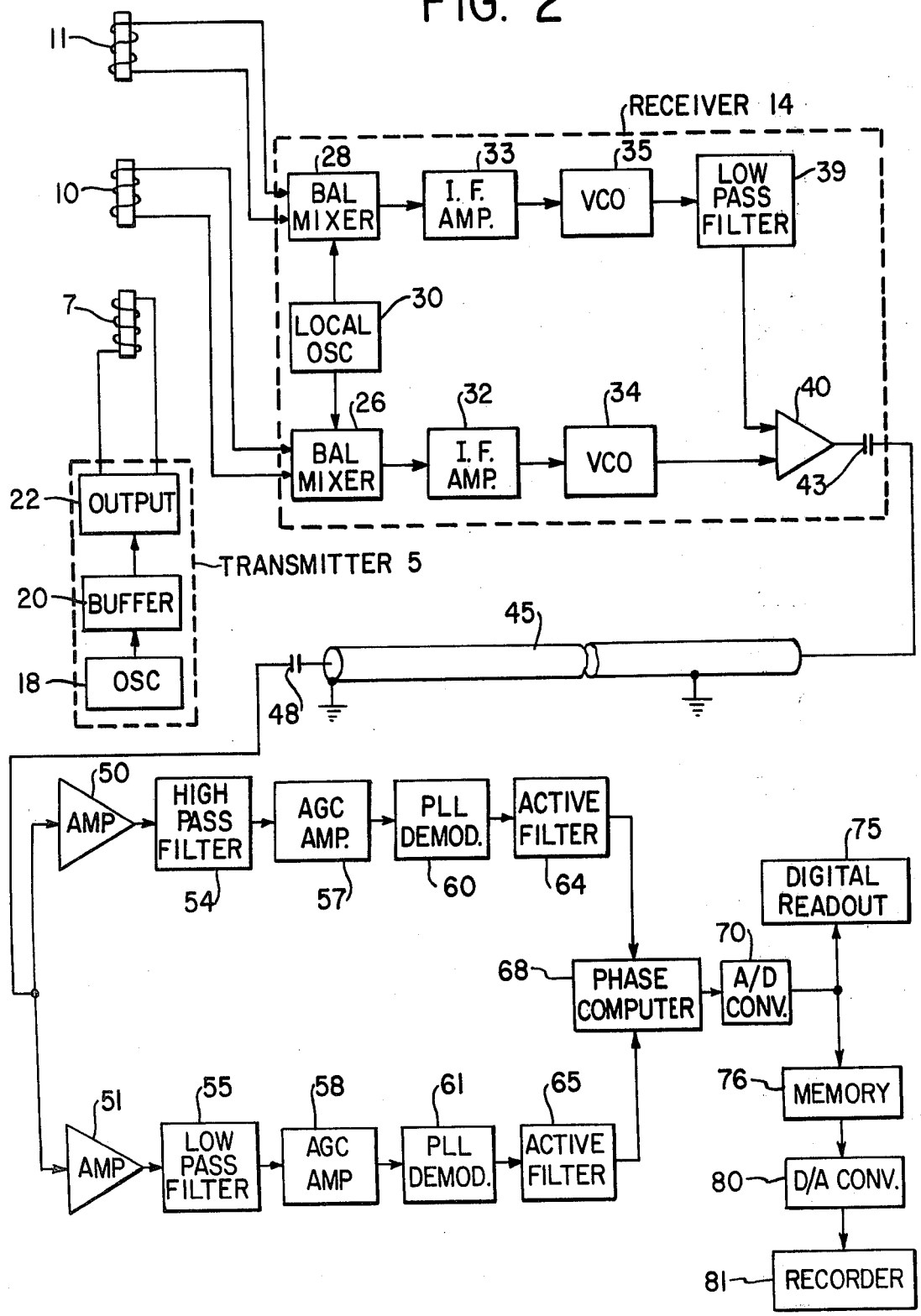
FIG. 2 is a simplified block diagram of a well logging system constructed in accordance with the present invention.

Referring now to FIG. 2, transmitter 5 includes an oscillator 18 providing a signal to a buffer amplifier 20 which in turn provides the signal to a power output amplifier shown as output 22. A typical power output would be in the order of 2 watts. The two megahertz signal emitted by coil 7 causes an electromagnetic field to propagate through the surrounding formation and this field is detected sequentially by receiver coils 10 and 11. The time lag or phase angle between the two signals detected at coils 10 and 11 is inversely proportional to the resistivity of the surrounding formation.

Coils 10, 11 provide signals to balanced mixers 26 and 28, respectively, which also receives a signal from a local oscillator 30 having a predetermined frequency of about 1.998 megahertz. Balanced mixers 26, 28 provide IF signals at a predetermined frequency, preferably about 2 kilohertz, to IF amplifiers 32 and 33, respectively, which, in turn provide IF signals to voltage controlled oscillators 34 and 35, respectively. Oscillator 34 provides an FM carrier frequency of 72 kilohertz, while oscillator 26 provides an FM carrier frequency of 26 kilohertz. The resulting signal from oscillator 35 is provided to a low pass filter 39 which in turn provides a signal to a cable driver 40 which also receives a resulting signal from oscillator 34. Cable driver 40 provides an output signal to a capacitor 43 to a single filament type well logging cable 45.

At the surface the signal from cable 45 passes through a DC blocking capacitor 48 and is communicated to amplifiers 50, 51. Amplifiers 50, 51 provide amplified signals to a high pass filter 54 and to a low pass filter 55, respectively. Filters 54, 55 provide signals to automatic gain control amplifiers 57 and 58, respectively, which in turn provide amplifier signals to phase lock loop demodulators 60 and 61, respectively. The outputs from demodulators 60, 61 are provided to active filters 64 and 65, respectively. Filters 64, 65 provide the signals corresponding in frequency to the original 2 kilohertz signals provided by mixers 26 and 28, respectively. The signals from filters 64, 65 are provided to a phase computer 68, or any other type of phase determining means, which provides a signal corresponding to the phase difference between the signals from filters 64 and 65, which in turn correspond to the resistivity of the formation. Phase computer 68 provides a signal to an analog-to-digital converter 70 which provides corresponding digital signals to a digital read-out 75 for immediate viewing and to a programmable memory 76. Memory 76 converts the digital phase signals into digital logrithmic resistivity digital signals and provides them to a digital-to-analog converter 80. Converter 80 provides a corresponding analog signal to a recorder 81.

Referring now to FIG. 3, logging sonde 1 includes a cable adaptor sub 100 having external threads and an internal passageway. Mounted within cable adaptor sub 100 is a feed through connector 104, having a wire 107 connected to one end. A connector mounting plate 112 is affixed to cable adaptor sub 100 by screws and has mounted thereon one part of a coaxial connector 114 which is electrically connected to wire 107. A receiver electronic case 119 is threaded onto cable adaptor sub 100 with sealant being accomplished by o-rings 120.

A connector mounting plate 123, having a mating part of coaxial connector 114 mounted thereon is located within receiver electronic case 119. An electronic mounting plate 126 is separated from connector mounting plate 123 by spacer rods 127. Mounting plates 126 has a channel 130 in it for the passage of wire (not shown) from connector 114. A second electronic mounting plate 133 is also located within receiver electronic case 119 and has a heat sink plate 134 mounted thereon. Spacing rods 128 provide strengthening features to the mounting plates 126, 133. An over voltage protection zener 138 is mounted to electronic mounting plate 133.

Referring now to FIG. 4, receiver electronic case 119 also includes electronic mounting plates 142 separated from electronic mounting plate 133 by spacer rods 145. Electronic mounting plate 147 cooperates with electronic mounting plate 142 and is separated therefrom by spacer rods 150, to support a receiver electronics board 154, affixed thereto. An electronic mounting plate 155 is used in conjunction with electronic mounting plate 147 to mount two receiver electronic boards 158, 160. Spacer rods 162 are used to provide rigidity between mounting plates 147, 155.

Receiver electronic case 119 also includes connector mounting plates 163, 164 mounted therein with mounting plate 163 being separated from electronics mounting plates 155 by spacer rods 168. A receiver coil connector 170 has one portion mounted on mounting plate 163 and its mating portion mounted on mounting plate 164. A guide pin 172 is mounted on mounting plate 164 and slides into a hole in mounting plate 163 to facilitate the connection of mating parts of connector 170.

It should be noted at this time that threaded rod, such as rod 176, is mounted at one end of each spacer rod which passes through a clearance hole in the various mounting plates to be threaded into the next spacer rod to give even more rigidity.

A mounting plate 180 is effectively affixed internal to receiver electronic case 119, by screws, to spacer rods 183. Mounting plate 180 is used to facilitate physical connection of a metal insert 186, having a channel 187, which is threaded into receiver electronics case 119 and further affixed thereto by the use of screws passing through mounting plate 180 and into metal insert 186. Again, sealant of receiver electronic base 119 is accomplished by o-rings 120.

Referring now to FIGS. 5 and 6, a metal insert 186 has a wire channel 187 and grooves 198. An epoxy glass spacer 194 is connected to metal insert 186 utilizing epoxy, grooves 198 and screws. A fiberglass covering 200 is wrapped around epoxy glass spacer 194, and other elements as hereinafter explained, after the physical construction and connections of those elements have taken place. A coil and shield assembly 206 which may be of the type disclosed and described in U.S. application Ser. No. 191,094 filed on Sept. 26, 1980, which is assigned to Texaco Inc., assignee of the present invention, is affixed to epoxy glass spacer 194 by screws. Another epoxy glass spacer 212 is also physically connected to a receiver coil and shield assembly 206 by screws. A second receiver and shield coil assembly 216 is also affixed to epoxy glass spacer 212. As can be seen epoxy glass spacer 212 has a wire channel 218. Receiver coil and shield assembly 212 is similar to receiver coil and shield assembly 206 with the slight difference being that assembly 206 has more passage space for wires than assembly 212. An epoxy glass spacer rod 224 is affixed to one end of the receiver coil and shield assembly 212 by screws.

Figure 7:
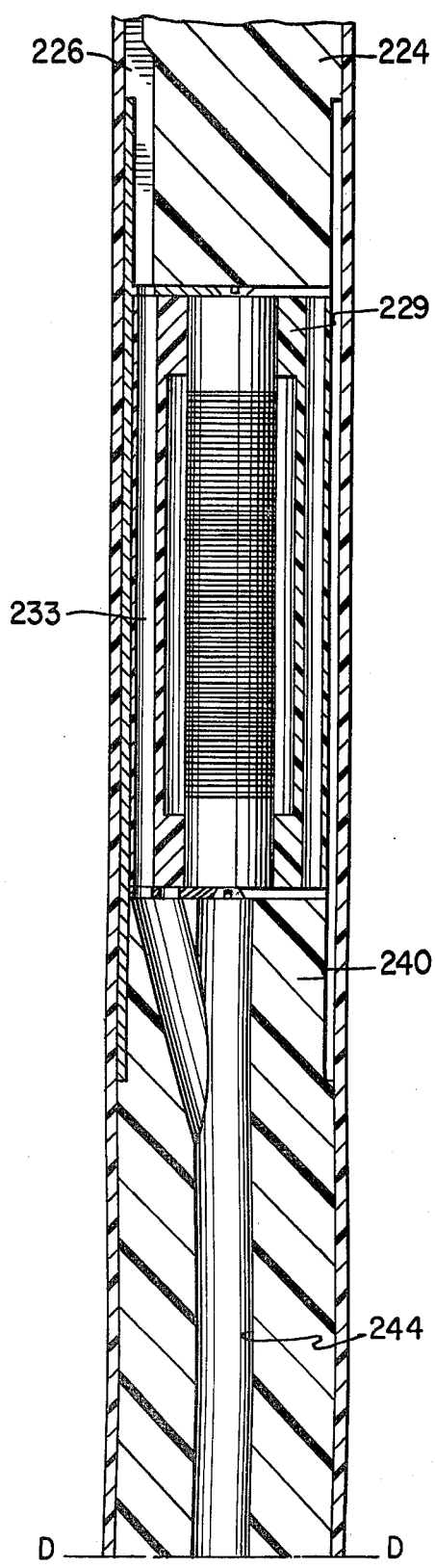
Figure 8:
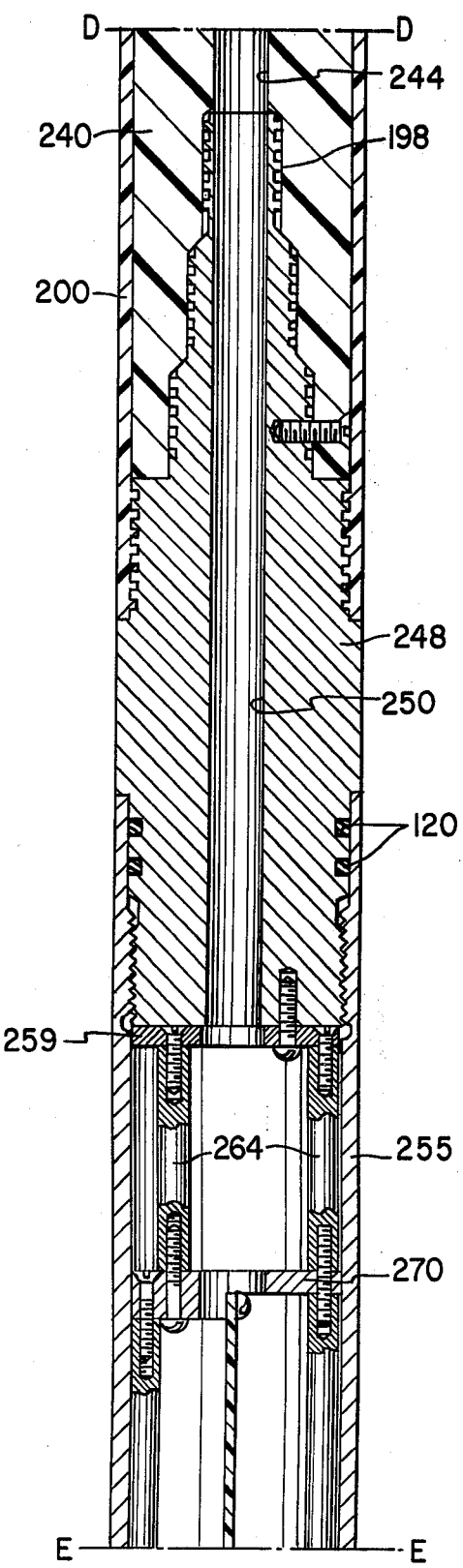

Referring to FIGS. 7 and 8, the other end of epoxy glass spacer 224 has a transmitter coil and shield assembly 229 attached to it by screws. Electronic coil and shield assembly 229 is similar to assembly 206 and 212 except that it is longer and the coil form is larger in diameter. Assembly 229 also includes a wire channel 233. Another epoxy glass spacer 240 is affixed to the other end of coil and shield assembly 229 by screws. Spacer 240 has a wire passageway 244 and grooves 198.

A metal insert 248 is in effect glued to the epoxy glass spacer 240 by epoxy cement in grooves 198. Metal insert 248 has a wire passageway 250. It should be noted that the fiberglass covering 200 reaches from metal insert 186 to metal insert 248.

An electronic case 255 is threaded onto metal insert 248 with sealing being accomplished by o-rings 120. A brass mounting 259 is part of transmitter electronics case 255 and is affixed thereto by screws which pass through and are screwed into spacer rods 264. Spacer rods 264 are physically connected to electronics mounting plate 270 which cooperates with electronics mounting plate 275, shown in FIG. 9, in having transmitter circuit board 278 affixed thereto. Again, rigidity is accomplished using spacer rods 222.

Still referring to FIG. 9, transmitter electronics case 255 has internal threads at its other end that is the end by electronic mounting plate 275 in which a bottom plug 280 is screwed into it. Again sealant is accomplished by o-rings 120.

Referring now to FIG. 10 which is a cross-sectional view taken in the direction of the arrows along the lines marked 10—10 in FIG. 4, there is shown the receiver electronic case 119, spacer rods 162, receiver electronics boards 158 and 160, electronics mounting plate 155 with wire passage holes 284 and 286.

Referring now to FIG. 11, there is shown the end view of receiver and coil and shield assembly 206, along line 11—11 in the direction of the arrows, having fiberglass covering 200, having a clearance hole 290 for the long space receiver coil coax, a clearance hole 292 for the transmitter power wire passageway and a clearance hole 294 for the short space receiver coil output coaxial.

Referring now to FIG. 12, there is shown another cross-sectional view of receiver coil and shield assembly 206 along line 12—12 in the direction of the arrows having the fiberglass covering 200, epoxy glass shield supports 300, a coax passageway hole 304, a power wire passageway hole 306, a receiver coil 308 and silicon rubber filler 312.

Referring now to FIG. 13, there is shown a cross-sectional view of the connection between receiver coil and shield assembly 216 and epoxy glass spacer 224 along the line 13—13 in the direction of the arrows. Also shown are fiber glass covering 200 and wire passageway 226.

The present invention is a slim hole well logging tool for logging wells without the removal of tubing in the wells.

What is claimed is:

1. A well logging sonde having an outer diameter of 1-11/16 inches or less, comprising
   a transmitter coil,
   at least two receiver coils,
   coil housing means having an outer surface for housing all the coils in a predetermined spatial relationship to each other,
   transmitter means electrically connected to the transmitter coil for providing a signal to energize the transmitter coil in the coil housing means to develop an electromagnetic field in an earth formation,
   transmitter case means having an outer surface and mechanically connected to the coil housing means for housing the transmitter means,
   receiver means electrically connected to the receiver coils for receiving signals from the receiver coils resulting from reception of electromagnetic energy from the electromagnetic field after passage through the earth formation and for providing a signal representative of at least one characteristic of the earth formation in accordance with the signals from the receiver coils,
   receiver case means having an outer surface and mechanically connected to the coil housing means for housing the receiver means, and
   cable connector means having an outer surface and mechanically connected to the receiver case means and to a well logging cable for providing the signal from the receiver means to the well logging cable; and
   in which the outer surfaces of the coil housing means, the transmitter case means, the receiver case means and the cable connector means comprise the outer surface of the well logging sonde.

2. A well logging sonde as described in claim 1 in which the mechanical connections between the transmitter case means, the coil housing means, the receiver case means, and the cable connector means are by threaded connections and each connection is provided with o-ring sealing means.

3. A well logging sonde as described in claim 2 in which the cable connector means includes cable connector means housing, a portion of a first electrical connector means mounted on the cable connector means housing, and means for electrically connecting the portion of the first electrical connector means to the well logging cable.

4. A well logging sonde having an outer diameter of 1-11/16 inches or less, comprising
   a transmitter coil,
   at least two receiver coils,
   coil housing means for housing all the coils in a predetermined spatial relationship to each other,
   transmitter means electrically connected to the transmitter coil for providing a signal to energize the transmitter coil in the coil housing means to develop an electromagnetic field in an earth formation,
   transmitter case means mechanically connected to the coil housing means for housing the transmitter means,
   receiver means electrically connected to the receiver coils for receiving signals from the receiver coils resulting from reception of electromagnetic energy from the electromagnetic field after passage through the earth formation and for providing a signal representative of at least one characteristic of the earth formation in accordance with the signals from the receiver coils,
   receiver case means mechanically connected to the coil housing means for housing the receiver means,
   cable connector means mechanically connected to the receiver case means and to a well logging cable for providing the signal from the receiver means to the well logging cable, in which the mechanical connections between the transmitter case means, the coil housing means, the receiver case means, and the cable connector means are by threaded connections and each connection is provided with o-ring sealing means; in which the cable connector means includes cable connector means housing, a portion of a first electrical connector means mounted on the cable connector means housing, and means for electrically connecting the portion of the first electrical connector to the well logging cable,
   and grooves on the cable connector means for the installation of the o-rings sealing means, in which the receiver case means has internal threads at each end and includes the mating portion of the first electrical connector, affixed near one end of the receiver case means, means for mounting the receiver means, first wire means for electrically connecting the receiver means to the mating portion of the first electrical connector means, and a portion of a second electrical connector means affixed internally to the receiver case means near the other end.

5. A well logging sonde as described in claim 4 in which the coil housing means includes
   a first metal adapter means having external threads at one end, the other end is adapted to fit into another member, and a wire passageway between the threaded end and the non-thread end;
   connector assembly means adapted to fit inside of the receiver case means and affixed to the threaded end of the first metal adaptor means and having the mating portion of the second electrical connection means mounted therein in a manner so that as the coil housing means is connected with the receiver case means the two portions of the second electrical connection means are mated;
   a first epoxy glass member connected to the unthreaded end of the first metal adaptor means and adapted at the other end to connect with a coil assembly means and an internal wire passageway from one end to the other end;
   first receiver coil assembly means having a receiver coil mounted therein and a wire passageway and adapted at end to be affixed to an epoxy glass member;
   first wire means for electrically connecting the receiver coil in the first receiver coil assembly means to the mating portion of the second electrical connector means, wherein said first receiver coil assembly means is affixed to the first epoxy glass means in a manner so that its receiver coil is electrically connected to the mating portion of the second electrical connector;
   a second epoxy glass member having a wire passageway affixed to the first receiver coil assembly;
   second receiver coil assembly means having one end affixed to the second epoxy glass member, having a receiver coil mounted therein and having a wire passageway;

second wire means for electrically connecting the receiver coil in the second receiver coil assembly means to the mating portion of the second electrical connection means;

a third epoxy glass member affixed to the other end of the second receiver coil assembly means and having a wire passageway;

transmitter coil assembly means having one end affixed to the other end of the third epoxy glass member, having the transmitter coil mounted therein and having a wire passageway;

a fourth epoxy glass member affixed to the other end of the transmitter coil assembly, and having a wire passageway;

second metal adaptor means having one end affixed to the other end of the fourth epoxy glass member, an externally threaded opposite end and a wire passageway; and transmitter wire means connected to the transmitter coil for being connected to the transmitter means.

6. A well logging sonde as described in claim 5 in which the transmitter case means includes a cylindrical metal shell having internal threads at each end, the transmitter means is mounted within the shell, means for connecting the transmitter wire means to the transmitter means, and bull plug means threaded to one end of the shell for providing weight and protection to the bottom end of the well logging means, and o-ring means for sealing the connection between the bull plug means and the shell.

7. A well logging sonde as described in claim 6 in which the coil housing means is wrapped with a fiber glass tape from a part of the first metal adaptor means to a part of the second metal adaptor means, and the outer diameter of the coil housing means when so taped does not exceed 1-11/16 inches.

8. A well logging system comprising a well logging sonde having an outer diameter of 1-11/16 inches or less including a transmitter coil, at least two receiver coils, coil housing means for housing all the coils in a predetermined spatial relationship to each other, transmitter means electrically connected to the transmitter coil for providing a signal to energize the transmitter coil to develop an electromagnetic field in an earth formation, transmitter case means having an outer surface and mechanically connected to the coil housing means for housing the transmitter means, receiver means electrically connected to the receiver coils for receiving signals from the receiver coils resulting from reception of electromagnetic energy from the electromagnetic field after passage through the earth formation and for providing a combined signal representative of at least one characteristic of the earth formation, in accordance with the signals from the receiver coils, receiver case means having an outer surface and mechanically connected to the coil housing means for housing the receiver means, cable connector means having an outer surface and mechanically connected to the receiver case means for providing the combined signal from the receiver means; and in which the outer surfaces of the coil housing means, the transmitter case means, the receiver case means and the cable connector means comprise the outer surface of the well logging sonde;

cable means mechanically connected to the cable connector means for providing the signal from the cable connector means to the surface; and surface electronics including means electrically connected to the cable means for providing two IF signals whose phase difference corresponds to at least one characteristic of the earth formation in accordance with the signals from the cable means, and output means electrically connected to the IF signal means for providing an output signal corresponding to the characteristic of the earth formation in accordance with the IF signals from the IF signal means.

9. A well logging system as described in claim 8 in which the mechanical connections between the transmitter case means, the coil housing means, the receiver case means, and the cable connector means are by threaded connections and each connection is provided with o-ring sealing means.

10. A well logging system as described in claim 9 in which the cable connector means include a cable connector means housing, a portion of a first electrical connector means mounted on the cable connector means housing, and grooves means for the installation of the o-ring sealing means and means for electrically connecting the portion of the first electrical connector means to the cable means.

11. A well logging system comprising a well logging sonde having an outer diameter of 1-11/16 inches or less including a transmitter coil, at least two receiver coils, coil housing means for housing all the coils in a predetermined spatial relationship to each other, transmitter means electrically connected to the transmitter coil for providing a signal to energize the transmitter coil to develop an electromagnetic field in an earth formation, transmitter case means mechanically connected to the coil housing means for housing the transmitter means, receiver means electrically connected to the receiver coils for receiving signals from the receiver coils resulting from reception of electromagnetic energy from the electromagnetic field after passage through the earth formation and for providing a combined signal representative of at least one characteristic of the earth formation, in accordance with the signals from the receiver coils, receiver case means mechanically connected to the coil housing means for housing the receiver means, and cable connector means mechanically connected to the receiver case means for providing the combined signal from the receiver means;

cable means mechanically connected to the cable connector means for providing the signal from the cable connector means to the surface; and surface electronics including means electrically connected to the cable means for providing two IF signals whose phase difference corresponds to at least one characteristic of the earth formation in accordance with the signals from the cable means, and output means electrically connected to the IF signal means for providing an output signal corresponding to the characteristic of the earth formation in accordance with the IF signals from the IF signal means; and in which the mechanical connections between the transmitter case means, the coil housing means, the receiver case means, and the cable connector means are by threaded connections and each connection is provided with o-ring sealing means; and in which the cable connector means includes a cable connector means housing a portion of a first electrical connector means mounted on the cable connector means housing, means for electrically connecting the portion of the first electrical connector means to the cable means and grooves means for the installation of the o-ring sealing means.

12. A well logging system as described in claim 11 in which the coil housing means includes a first metal adapter means having external threads at one end, the other end is adapted to fit into another member, and a wire passageway between the threaded end and the non-thread end;

connector assembly means adapted to fit inside of the receiver case means and affixed to the threaded end of the first metal adaptor means and having the mating portion of the second electrical connection means mounted therein in a manner so that as the coil housing means is connected with the receiver case means the two portions of the second electrical connection means are mated;

a first epoxy glass member connected to the unthreaded end of the first metal adaptor means and adapted at other end to connect with a coil assembly means and an internal wire passageway from one end to the other end;

first receiver coil assembly means having a receiver coil mounted therein and a wire passageway and adapted at ends to be affixed to an epoxy glass member;

first wire means for electrically connecting the receiver coil in the first receiver coil assembly means to the mating portion of the second electrical connector means, wherein said first receiver coil assembly means is affixed to the first epoxy glass means in a manner so that its receiver coil is electrically connected to the mating portion of the second electrical connector;

second epoxy glass member having a wire passageway is affixed to the first receiver coil assembly;

second receiver coil assembly means having one end affixed to the second epoxy glass member having a receiver coil mounted therein and having a wire passageway;

second wire means for electrically connecting the receiver coil in the second receiver coil assembly means to the mating portion of the second electrical connection means;

a third epoxy glass member affixed to the other end of the second receiver coil assembly means and having a wire passageway;

transmitter coil assembly means having one end affixed to the other end of the third epoxy glass member, having the transmitter coil mounted therein and having a wire passageway;

a fourth epoxy glass member affixed to the other end of the transmitter coil assembly, and having a wire passageway;

second metal adaptor means having one end affixed to the other end of the fourth epoxy glass member, an externally threaded opposite end and a wire passageway; and transmitter wire means connected to the transmitter coil for being connected to the transmitter means.

13. A well logging system as described in claim 12 in which the transmitter case means includes a cylindrical metal shell having internal threads at each end, the transmitter means is mounted within the shell, means for connecting the transmitter wire means to the transmitter means, and bull plug means threaded to one end of the shell for providing weight and protection to the bottom end of the well logging means, and o-ring means for sealing the connection between the bull plug means and the shell.

14. A well logging system as described in claim 13 in which the coil housing means is wrapped with a fiber glass tape from a part of the first metal adaptor means to a part of the second metal adaptor means, and the outer diameter of the passive element means when so taped does not exceed 1-11/16 inches.

15. A well logging system as described in claim 14 in which the transmitter means includes oscillator means providing a signal at a predetermined frequency, buffer amplifying means connected to the oscillator means for providing the signal from the oscillator means without loading down the oscillator means, and output means connected to the buffer means and to the transmitter coil for energizing the transmitter coil in accordance with the signal from the buffer amplifying means.

16. A well logging system as described in claim 15 in which the receiver means includes local oscillator means for providing a signal at a second predetermined frequency, mixer means, one mixer means being connected to one receiver coil and to the local oscillator means and the other mixer means being connected to the other receiver coil and to the local oscillator means, for mixing the signal from the local oscillator means with the signals being provided by the receiver coil means, two IF amplifier means, each IF amplifier means being connected to a corresponding mixer means for amplifying signals provided by the mixer means, two voltage controlled oscillator means being connected to the corresponding IF amplifier means with one voltage controlled oscillator means providing a signal at a third predetermined frequency while the other voltage oscillator means provides a signal at a fourth predetermined frequency, low pass filter means connected to the voltage controlled oscillator means providing the signal having the lower frequency of the two signals from the voltage controlled oscillator means, and cable driver means connected to the other voltage controlled oscillator means and to the low pass filter means and to the cable means for combining the signals to provide the combined signal to the cable means.

17. A well logging system as described in claim 16 in which the IF signal means includes
- two amplifiers connected to the cable means for amplifying the combined signal therefrom,
- high pass filter means connected to one amplifier means for passing high frequency signals,
- low pass filter means connected to the other amplifier for passing low frequency signal,
- two automatic gain controlled amplifiers means,
- one automatic gain controlled amplifier means being connected to the high pass filter means and the other automatic gain controlled amplifier means being connected to the low pass filter means for amplifying the signals therefrom,
- two phase lock loop demodulating means, each demodulating means being connected to a corresponding automatic gain controlled amplifier, means for providing a demodulated signal in accordance with the signal from the automatic gain control amplifier means, and
- two active filter means connected to corresponding phase lock loop demodulating means for providing the IF signals in accordance with the signals from the phase lock loop demodulating means.

18. A well logging system as described in claim 17 in which the output means includes
- phase computer means connected to the active filer means for providing an analog signal corresponding to the phase difference of the signals from the active filter means as the output signal.

19. A well logging system as described in claim 18 in which the surface electronics further comprises
- analog-to-digital converting means connected to the phase computer means for providing digital signals corresponding to the analog signal from the phase computer means.

20. A well logging system as described in claim 19 in which the surface electronics further comprises
- digital read out means connected to the analog-to-digital converter means.

21. A well logging system as described in claim 20 in which the surface electronics further comprises
- memory means connected to the analog-to-digital converting means for storing the digital signals,
- digital-to-analog converting means connected to the memory means for converting the digital signals to an analog signal, and
- recording means connected to the digital-to-analog converting means for recording the analog signal.

22. A well logging system as described in claim 8 or 18 in which the surface electronics further comprises
- means for recording the output signal.

* * * * *